United States Patent [19]
Voronin et al.

[11] 3,815,509
[45] June 11, 1974

[54] APPARATUS FOR THE AUTOMATIC CONTROL OF A MONORAIL ROAD

[76] Inventors: Mjud Izrailevich Voronin, ulitsa Udaltsova, 16, kv. 138; Gennady Petrovich Gnusarev, ulitsa Flotskaya, 56, korp. 1, kv. 103; Abram Grigorievich Mekler, ulitsa Nagornaya, 45b, korp. 25, kv. 70; Viktor Ivanovich Sosedov, ulitsa Nagornaya, 19, korp. 24, kv. 5, all of Moscow, U.S.S.R.

[22] Filed: May 26, 1972

[21] Appl. No.: 257,401

Related U.S. Application Data

[63] Continuation-in-part of Ser. No. 202,909, Nov. 29, 1971, abandoned, which is a continuation-in-part of Ser. No. 838,918, July 3, 1969, abandoned.

[52] U.S. Cl.................. 104/88, 246/25, 340/149 A
[51] Int. Cl............................................. B61l 11/08
[58] Field of Search......... 104/88; 248/25, 2 E, 2 F; 340/149 A

[56] References Cited
UNITED STATES PATENTS

| | | |
|---|---|---|
| 3,117,754 | 1/1964 | Morganstern.......................... 246/25 |
| 3,440,972 | 4/1969 | Sidebotham et al.................. 104/88 |
| 3,474,877 | 10/1969 | Wesener.............................. 104/88 |

*Primary Examiner*—M. Henson Wood, Jr.
*Assistant Examiner*—George H. Libman
*Attorney, Agent, or Firm*—Waters, Roditi, Schwartz & Nissen

[57] ABSTRACT

An apparatus for the automatic control of a monorail road having a plurality of movable objects and switches for changing tracks, in which set-up units are located at each of the destination points and before each of the switches for changing tracks to record information which is read out by sensors and converted from one code into another with the help of a decoder whose outputs are connected, via switches, to logical elements issuing signals to stop the movable objects and to switch the means for changing tracks.

2 Claims, 3 Drawing Figures

APPARATUS FOR THE AUTOMATIC CONTROL OF A MONORAIL ROAD

The present application is a continuation-in-part of application Ser. No. 202,909 filed Nov. 29, 1971 which is a continuation of application Ser. No. 838,918 filed on July 3, 1969, both of said applications now abandoned.

The invention relates to apparatus for effecting the automatic guidance of loads toward any desired destination point along a monorail route, without requiring attendants for manually guiding the load toward the destination point, and, more particularly, it relates to apparatus for the automatic guidance and control of a movable object incorporating an individual drive, such as an electric hoist and the like, moving along a track having track change means, such as track switches, load lowering stations, and so forth.

There is known apparatus, for the automatic guidance and control of a movable object, capable of effecting automatic guidance of loads toward destination points without requiring attendants for manually guiding the load toward a desired destination point, such apparatus including: setup units provided at each one of the destination points and immediately preceding each one of the track change means (referred to hereinafter as a "track switch"), said setup units having recorded therein coded information related to the destination points and to the track switches, respectively, a plurality of sensors adapted to read the information recorded in each one of said setup units, a decoder having a plurality of inputs to which said sensors are connected, selector switches for presetting a desired destination point, connected to the outputs of said decoder, a logical element connected to said selector switches and adapted to issue a command to stop said movable object upon the occurrence of coincidence of the information preset with the help of said selector switches and that supplied by said sensors.

In the known apparatus for the automatic guidance and control of a movable object, the setup units disposed at the destination points and immediately preceding the track switches have recorded therein coded information which is intended for parallel or simultaneous reading out of the entire recorded information. Consequently, with the volume of the recorded information varying, the number of the sensors adapted to respond to this information has to be varied, accordingly. Thus, in the case of a monorail track system offering a choice of 15 and less destination points, the apparatus for the automatic guidance and control of a movable object is bound to have four sensors; should the number of the destination points be increased to thirty, the device is bound to have five sensors. The greater the number of the sensors, the more complicated becomes the structure of the apparatus for the automatic guidance and control of a movable object.

It is an object of the present invention to provide an apparatus for the automatic guidance and control of a movable object, which includes a permanent number of the sensors, irrespective of the number of the destination points and of the track switches of a monorail track system, along which such object can be guided from one destination point to another without manual attendance.

This object is attained in an apparatus for the automatic guidance and control of a movable object, wherein there is mounted before each one of the plurality of destination points a setup unit having recorded therein coded information related to the destination points and to the track switches, said movable object carrying therewith sensors adapted to read out the information. Said sensors are connected to the inputs of a decoder means, said decoder means having the outputs thereof connected to selector switches for presetting a desired destination point of said movable object. Said selector switches are connected to the inputs of a logical element adapted to issue a command to stop said movable object upon coincidence of the information preset with the help of said selector switches and supplied by said sensors. In this apparatus, in accordance with the invention, each one of said setup units, disposed before the respective one of said destination points, comprises groups of elements displaced in respect of one another in the direction of the travel of said movable object, said information recorded in each one of said groups in a binary coded form being convertible into a system of notation, different from the binary system. Each one of said setup units, disposed before a track switch, comprises groups of said elements having recorded therein, in a coded form, a part of said information, related to the respective one of said switches. The rest of the groups of said elements of said setup unit have recorded therein, in a coded form, information related to the respective ones of said destination points, disposed after said last-mentioned track switch along the route of said movable object. Said sensors are adapted to read successively said information recorded in the coded form in the consecutive groups of said elements of each said setup unit.

It is advisable, in order to effect automatic sending of a command for operation of a track switch, for said apparatus for the automatic guidance and control of a movable object to incorporate a second logical element connected to said decoder means and adapted to issue a command initiating operation of said track switch, upon coincidence of the information coming successively through said selector switches, said decoder means and said sensors from those of said groups of said elements of said setup units, wherein there is recorded that part of said information, which is related to said destination points, and the information supplied through said decoder means and said sensors from groups of said elements of that one of said setup units, which is disposed immediately preceding said last-mentioned track switch.

The above-described structure of a setup unit, wherein the full volume of the information is recorded in successive portions with the help of the groups of elements, makes it possible to employ a minimum permanent number of the sensors, irrespective of this volume of the information. Furthermore, by providing the above-mentioned second logical element and by employing the above-described technique of recording and reading out the information, it has become possible to create an apparatus for the automatic guidance and control of a movable object, employable with a monorail track system having any desired number of destination points and track switches, wherein it is sufficient to preset only the desired destination point, the commands for the appropriate operation of the track switches being developed automatically.

The present invention will be better understood from the following detailed description of an embodiment thereof, with reference to the accompanying set of drawings, wherein.

Figure 1:
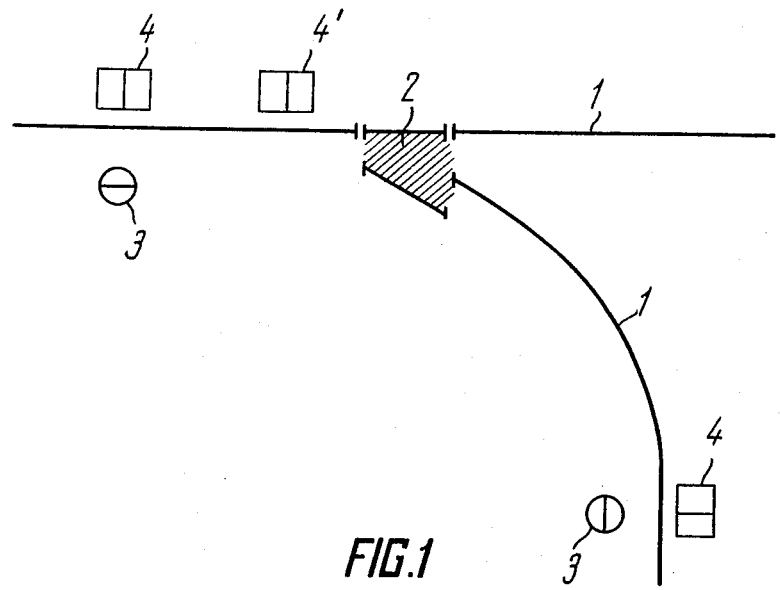
FIG. 1 illustrates schematically a portion of a monorail track system and the setup units of the herein disclosed apparatus for the automatic guidance and control of a movable object.

Referring now in particular to the appended drawings, the herein disclosed apparatus for the automatic guidance and control of a movable object is adapted to travel along a monorail track 1 (FIG. 1) and to initiate operation of the track switches 2 of the monorail track 1, as well as to bring the movable object associated therewith to a standstill at a desired destination point 3 along this monorail track 1 (a single track switch 2 is shown in FIG. 1 for the sake of clarity and convenience of description). Each movable object (not shown) is associated with its own device for automatic control and guidance thereof, constructed in accordance with the invention, and may be in the form of an electric hoist.

The herein disclosed device for automatic guidance and control of a movable object comprises setup units 4 located at each one of a plurality of destination points 3 and immediately preceding each track switch 2, the setup units 4 having recorded therein coded information relating, respectively, to the destination points 3 and to the track switches 2.

Each one of the plurality of setup units 4 includes groups of elements displaced relative to one another along the path of the travel of the said movable object along the monorail track. Each one of the said setup units, which is mounted immediately preceding the respective track switch 2 comprises groups of elements having recorded therein coded information relating to those of the destinations 3 which are after, or downstream of the last-mentioned track switch, each said group of elements corresponding to the respective one of said destination points 3. These elements in each one of the setup units 4 (FIG. 2) are in the form of permanent magnets 6 and 7 mounted in the gaps intermediate of trolley wires or bars 5 of the monorail track 1, the magnets 6 being address ones and the magnets 7 being guidance and control ones.

The herein disclosed apparatus for the automatic guidance and control of a movable object further incorporates sensors 8 (FIG. 3) adapted to respond to successive information recorded in the consecutive groups of the elements of the setup units 4 located, respectively, at the destination points 3 and immediately preceding each track switch 2. Furthermore, the apparatus for the automatic guidance and control of a movable object, constructed in accordance with the invention, includes a decoder 9 of which the inputs are connected to the sensors 8 and of which the outputs are connected through selector switches 10 and 11, intended for presetting a desired destination point 3, with logical elements 12 and 13. The logical element 12 is adapted to operate and to control correspondingly the associated movable object, when the information preset with the help of the selector switches 10 and 11 corresponds to that read by the sensors 8. The logical element 13 is meant to develop a control signal initiating shifting of the respective track switch 2. The decoder 9 in the presently described embodiment is a diode matrix, whereas each one of the logical elements 12 and 13 includes an "AND" circuit.

Although in the presently described embodiment a single movable object (e.g., a single electric hoist) and a single track switch are mentioned, it should be understood that apparatus constructed in accordance with the present invention can be employed for construction of an automatically operating monorail track system having a plurality of movable objects (e.g., a plurality of electric hoists) and a plurality of track switches.

Figure 2:
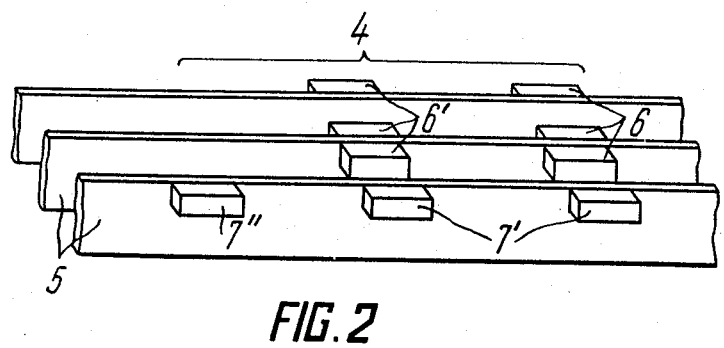
FIG. 2 shows a general view of the setup unit of the herein disclosed apparatus for automatic guidance and control of a movable object.

In FIG. 1 the set-up units are shown as rectangles standing for groups of elements which are shown in greater detail in FIG. 2. A set-up unit comprises three groups of magnets (right to left in FIG. 2): the first group includes three address magnets 6 and one control magnet 7; the second group includes three address magnets 6' and one control magnet 7', and the third group consists of one control magnet 7". The address magnets are used to record information, while the control magnets define the beginning of information read-out. A hypothetical number, 77, is recorded in FIG. 2.

Figure 3:
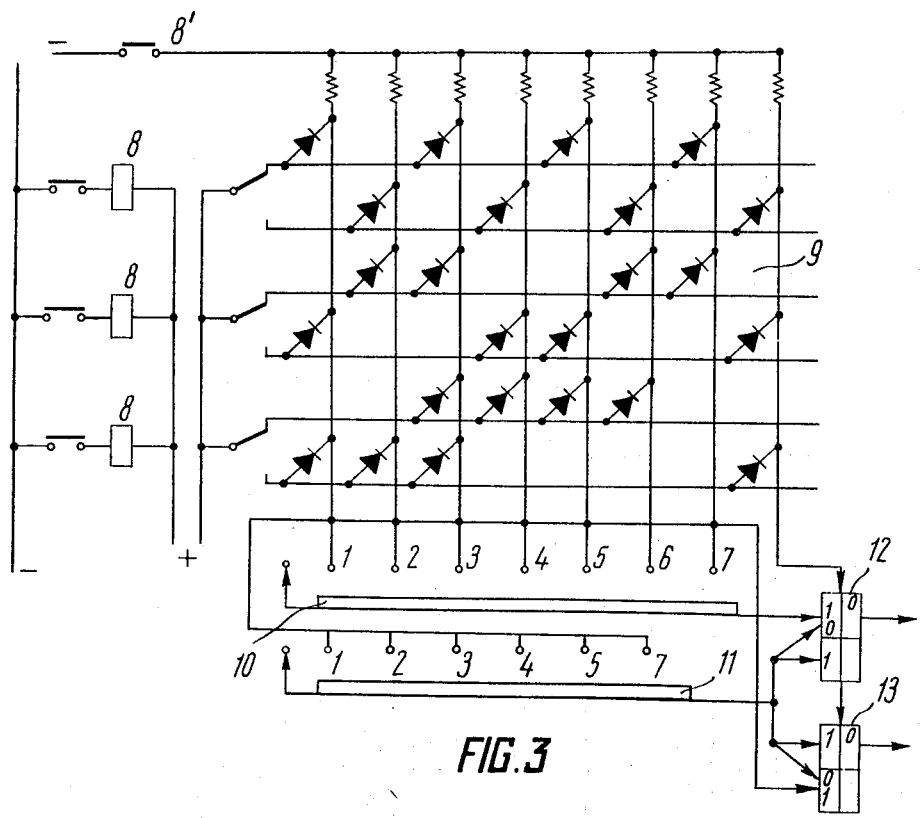
FIG. 3 shows the circuit diagram of the logical circuitry of the apparatus for the automatic guidance and control of a movable object, according to the present invention.

The conversion of information from the binary system to the octal code is not shown in FIG. 2, but can be clarified in FIG. 3, in the left-hand part of which the numerals 8 identify three sensors cooperating with the address magnets. The sensors 8 read out in succession the information recorded in each group of elements of a set-up unit, and the decoder 9 converts the information from the binary code to an octal code, information being applied, via the switches 10 and 11, to the inputs of the logical elements 12 and 13.

In FIG. 3, the numeral 8' identifies a sensor cooperating with the control magnets and defining the beginning of information read-out, i.e., it connects the decoder 9. After the information has been recorded in the logical elements 12 and 13, the recording is checked by operating the sensor 8' in a line leading out of the decoder to the logical elements 12 and 13. If no information has been recorded in the logical elements 12 and 13, the sensor 8', when operated, issues an information checking signal as well.

When the information is encoded in the case illustrated in FIG. 3, the track switch bears the numeral 6, while the switches are only given the destination points, the sixth line leading independently to the logical element 13.

In order to elucidate the operation of the apparatus, the following example is described below, illustrating the passage of the signal when the switches 10 and 11 are given destination points of the movable object.

For instance, a destination point is assigned numeral 23 which is entered in a binary code, with the help of the magnets 6 and 7, into the unit preceding the destination point. The switch 10 is set to numeral 2 and the switch 11, to numeral 3. As the movable object approaches the destination point 23, the first numeral 2 is read out in the set-up unit 4 first by the sensor 8 and then by the sensor 8'. When the sensors 8 and 8' are switched on during the read-out of numeral 2, the decoder converts the information from the binary code to the octal code, and the second output of the decoder will show a signal which is recorded, via the switch 10, in the top part of the logical element 12. As the movable object moves farther, the second numeral 3, is read out in the unit 4, and the sensors 8 and 8' are switches on similarly, the third output of the decoder 9 showing a signal which is applied, via the switch 11, to the bottom part of the logical element 12. As the object moves still farther, only the sensor 8' is switched on, the signal from the eighth output of the decoder being supplied to the logical element 12. Since two signals have so far been recorded in the logical element 12, the third signal will cause the logical element to operate and issue a signal to stop the movable object.

The operation of the herein disclosed apparatus for the automatic guidance and control of a movable object is further described hereinbelow:

The apparatus for the automatic guidance and control of a movable object travels together with the associated movable object, i.e., with the associated electric hoist, along the monorail track 1, the sensors 8 first reading the information recorded in the first group of the permanent magnets 6 and 7 of the first setup unit 4, then reading the information recorded in the second group, etc., thus reading in succession the information in each setup unit 4 located at the respective destination points 3 and track switch 2, which the movable object passes by in its travel.

The information coming from each group of the elements of the successive setup units 4 is supplied to the inputs of the decoder 9 where it is converted from binary notation to an eight-base notation. Depending on the combination of the signals that are sent to the input of the decoder 9, corresponding signals appear at the respective outputs thereof.

The outputs of the decoder 9 are connected in a corresponding pattern to the inputs of the logical elements 12 and 13 through the selector switches 10 and 11 intended, as it has been already mentioned, for presetting a desired destination point 3.

After the movable object has passed the appropriate one of the setup units 4, and the input of the logical element 12 has received the corresponding sequence of signals developed by the sensors 8 and converted by the decoder 9, the logical element 12 operates and sends a control signal to stop the movable object - the electric hoist.

Thus, the logical element 12 operates only when the information read by the sensors 8 coincides with that preset by the corresponding setting of the selector switches 10 and 11.

In order to render the task of the operator of the monorail track system more simple, the setup units are located immediately preceding the track switches 2, and the apparatus for the automatic guidance and control of a movable object incorporates another logical element 13 connected with the logical element 12 and further connected through the decoder 9 and the selector switch 11 with the sensors 8, in order to effect generation of control signals initiating desired operation of the corresponding track switches 2.

Thus, the selector switches 10 and 11 are preset by the operator only to define the desired destination point 3, while the operation of the appropriate track switches 2 along the route of the movable object toward this destination point is effected automatically.

To achieve this, the setup unit 4 positioned immediately before the track switch 2 has the last group of the magnets 6 and 7, wherein there is recorded a digit "six", while the groups of the magnets 6 and 7 preceding this last group have recorded therein that part of the information, which relates to the destination points 3.

For example, the herein disclosed apparatus generates a command for shifting the track switch 2, when the movable object is to be guided to one of the destination points 3 in the setup unit 4 of which there is recorded either 13, 23, 43 or 14, 24, 34, etc. while, in the setup unit positioned before the track switch 2, the series of digits recorded is 346.

The herein disclosed apparatus for the automatic guidance and control of a movable object can be employed for construction of monorail track systems with automatic guiding of the objects to the destination points, incorporating any number of the objects, e.g., of electric hoists, and any number of track switches.

Consequently, the present invention results in the provision of a compact-size, reliable and simply operating apparatus for the automatic guidance and control of a movable object, the major part of this apparatus being mounted either on the movable object itself, or else on an individual carriage operatively connected with the monorail-supported carriage of the movable object itself.

What is claimed is:

1. An apparatus for the automatic guidance and control of a movable object, and for effecting the automatic operation of track switches and the automatic arresting of the travel of said movable object at any of a plurality of destination points along a monorail track system, comprising: setup units provided at each one of the plurality of said destination points and preceding each of said track switches; said setup units having recorded therein information coded in binary form relating to said destination points of said movable object and to said track switches, respectively; each of said setup units comprising groups of elements displaced in relation to one another in the direction of the travel of said movable object; each one of said setup units, being mounted so that it precedes the respective one of said track switches, including a group of said elements having recorded therein in a coded form a part of said information related to said last-mentioned one of said track switches, the rest of the groups of said elements of said setup unit having recorded therein in a coded form information related to the respective ones of said destination points, positioned downstream of said last-mentioned track switch along the route of said movable object; a plurality of sensors on said movable object adapted to read successively said coded information recorded in each said group of said elements of said setup units; decoder means having a plurality of inputs to which said sensors are connected for converting said information into a notation system different from binary notation; selector switches for presetting, in the different notation system, a desired destination point for said movable object, connected to the outputs of said decoder means; a logical element connected to said selector switches and adapted to issue a command to stop said movable object upon coincidence of information preset with the help of said selector switches and transmitted by said sensors, as the latter successively read information recorded in said groups of said elements of said setup unit.

2. An apparatus as claimed in claim 1, further comprising a second logical element connected to said decoder means and to said first-mentioned logical element, said second logical element being adapted to issue a command for operation of said track switch upon coincidence of information supplied in succession through said selector switches, said decoder means and said sensors from said setup units wherein there is recorded that part of said information which relates to said destination points, and information received through said decoder means and said sensors from said setup unit disposed immediately preceding said track switch.

* * * * *